United States Patent [19]

Stiebel

[11] 4,233,838

[45] Nov. 18, 1980

[54] LOAD CONTROL FOR TIRE TEST MACHINE

[75] Inventor: Ariel Stiebel, Bloomfield Hills Township, Oakland County, Mich.

[73] Assignee: Uniroyal, Inc., New York, N.Y.

[21] Appl. No.: 41,373

[22] Filed: May 22, 1979

[51] Int. Cl.³ .......................................... G01M 17/02
[52] U.S. Cl. ..................................................... 73/146
[58] Field of Search .................. 73/146, 808, 810, 812

[56] References Cited

U.S. PATENT DOCUMENTS

| | | | |
|---|---|---|---|
| 3,948,095 | 4/1976 | Burgett et al. | 73/146 |
| 4,134,292 | 1/1979 | Honlinger et al. | 73/146 |

*Primary Examiner*—Jerry W. Myracle
*Attorney, Agent, or Firm*—Jack Posin

[57] ABSTRACT

A control for controlling load on a tire undergoing testing while rotating in a loaded condition against a test road wheel. As the tire temperature increases during the warm up period of the tire and inflation pressure and load consequently also increase, the control will automatically decrease the load applied to the tire to maintain a preset load on the tire. During equilibrium temperature and pressure conditions of the tire, the control will effectuate decreases in load only and will not permit the tire load applicator to oscillate the load about the reset load point. The load applicator is maintained in an inactive condition by the control means except when a load decrease is necessary. During equilibrium temperature and load conditions on the tire, a relatively fast increase in temperature and a correspondingly fast load increase indicating incipient failure of the tire can be detected by the control.

12 Claims, 4 Drawing Figures

LOAD CONTROL FOR TIRE TEST MACHINE

BACKGROUND OF THE INVENTION

The present invention relates generally to apparatus for testing tires and more particularly to a control means for controlling the load on a tire held in loaded engagement with a rotating test road wheel.

It is well-known in the art to test tires for operating and endurance characteristics by holding them in a loaded condition against a rotating road wheel for a specified length of time and at desired conditions of load, inflation pressure, speed and ambient temperature. For a considerable number of years tire manufacturing companies have performed these tests to gather information for their own tire evaluation purposes. In addition, in the past few years, the United States Department of Transportation (D.O.T.) has also required that these tests be made under specified conditions and that results of such tests be supplied to the D.O.T. A critical requirement in such tests is that the specified load be maintained throughout the test period which frequently lasts a number of days of continuous running. Older type road wheel testing machines utilized a manual application of weights which, through leverage arms or other suitable arrangements, applied load to the tire undergoing testing. However, such machines required continuous attention from test personnel due to the lack of a self-regulating load control. Moreover, since a tire exhibits characteristics generally associated with springs, the load actually applied to the tire would vary even though the weight on the test machine was constant. More recently, load control mechanisms have been developed in which tire load feedback information is utilized to operate a servo system in which the load is continuously adjusted by a motor driven screw or hydraulic pump to maintain it constant on the tire. Again, because of the spring-like characteristics of a tire, the servo system oscillates substantially about the preset load point. This is particularly a problem in a screw type loading system which has a slow reaction time and therefore hunts to a greater degree about the set load point. Further, in hydraulic type servo systems, the null bias present in all servo valves also causes the control to continuously oscillate about the reference load set point. The consequence of the continuous oscillating of such feedback servo systems is that the hydraulic pump and valve or screw motor and related controls are in a continuous operating state and have a relatively short useable life. In addition, because of the continuous operation of such controls, it is difficult to detect the inception of tire failure prior to the time the tire disintegrates by monitoring the operation of the controls.

SUMMARY OF THE INVENTION

It is an object of the present invention to provide an improved and simplified control means and method for controlling the load applied to a tire undergoing testing while rotating in engagement with a test road wheel.

It is a further object of the present invention to provide a control means and method for controlling the load applied to a tire rotating in engagement with a test road wheel in which the applied load is controlled in a decreasing direction only.

It is another object of the present invention to provide a control means and method for controlling the load applied to a tire rotating in engagement with a test road wheel in which the load applying means is inactive except when load is being decreased.

It is a still further object of the present invention to provide control means and method for applying load to a tire undergoing testing while rotating in engagement with a test road wheel in which the operation of the load control means is indicative of incipient failure of the tire undergoing testing.

The objects of the invention are accomplished by the provision of control means in which the actual load on a tire, while it rotates in engagement with a test road wheel, is compared with a desired preset load value and adjustments are automatically made to the actual load to maintain it at the preset load value. At the initiation of the testing of the tire, the load is increased until it exceeds a load level. Thereafter, as the tire temperature increases and the inflation pressure within it and the load on it therefore correspondingly increase, the load is decreased until temperature and load equilibrium conditions are attained or a controlled load change is made. The control means operates the loading means only to decrease the load subsequent to the initial loading to the preset load level, and therefore the control means and loading means are each in inactive conditions between load decreasing operations. At the inception of failure of the tire, its temperature and therefore its inflation pressure and load will increase at a rate which is considerably faster than is the case during non-failing opertion of the tire. This will result in repeated relatively rapid operations of the control means which can be readily monitored to detect the incipient failure inasmuch as the control means does not operate to make load changes during equilibrium test conditions except when the load increases as the result of changing tire conditions.

DESCRIPTION OF THE PREFERRED EMBODIMENT

Figure 1:
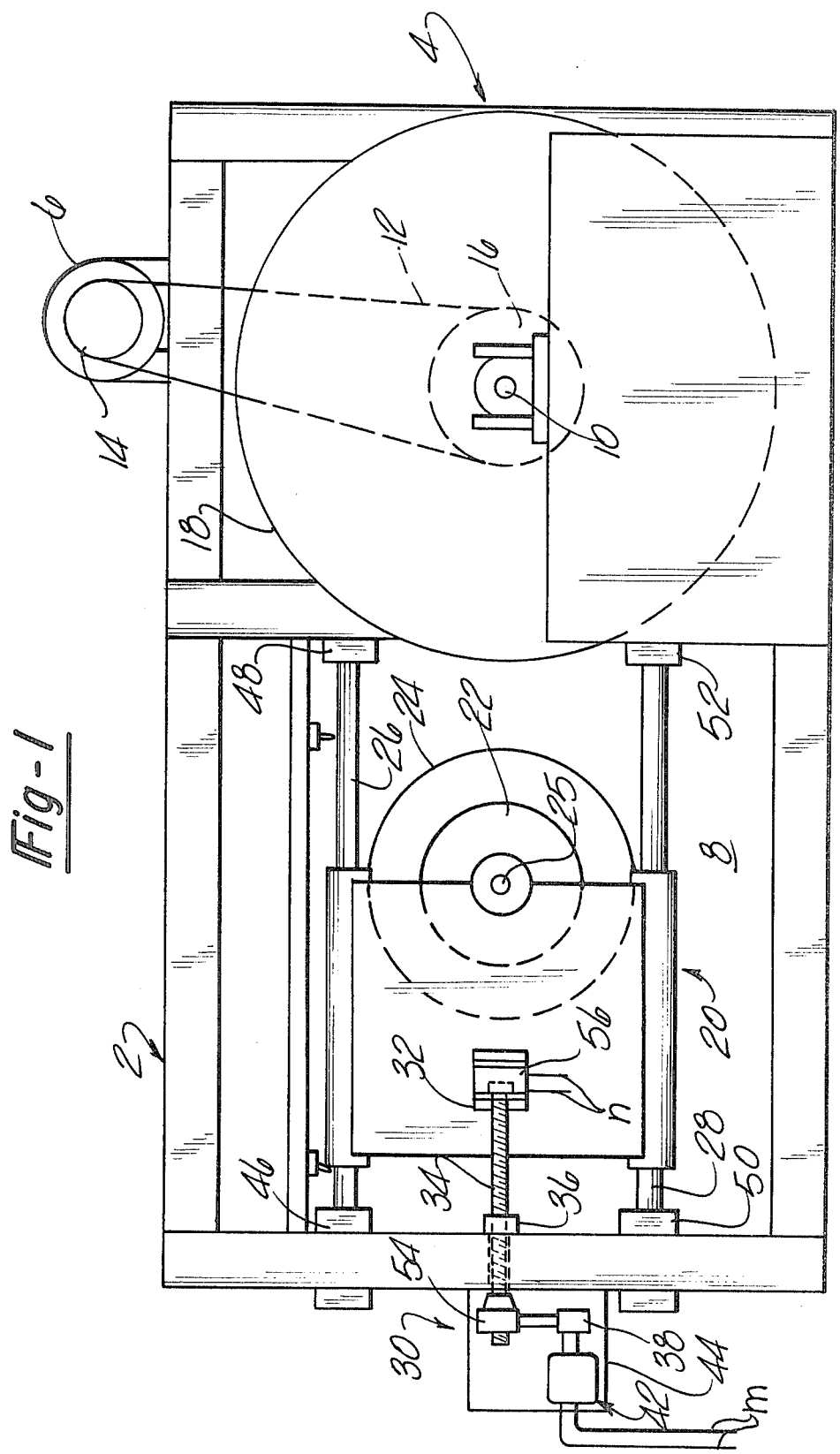
FIG. 1 is an elevational view of an apparatus including a test road wheel for testing a tire.

Referring now to the drawings and in particular with reference to FIG. 1, an apparatus for the testing of tires is shown as having a frame 2, a test road wheel 4 rotatably mounted on the frame 2, a motor 6 for rotating the road wheel 4, and a tire loading means 8 also mounted on the frame 2. The road wheel 4 is rotatably mounted on the frame 2 by means of spindle 10 and is driven by belt 12 connected between pulley 14 on the motor 6 and pulley 16 on the road wheel spindle 10. The road wheel 4 has an exterior cylindrical surface 18 which typically is smooth and has a width at least equal to the tread width of the tire being tested.

The tire loading means 8 comprises a tire holding means 20 having a chuck 22 rotatably supported on spindle 25, a tire 24 mounted on chuck 22, guide rods 26 and 28 on which the holding means 20 is slideably supported, and drive means 30 mounted on the frame 2 and connected to the holding means 20. The guide rod 26 is journaled in brackets 46 and 48 and the guide rod 28 is journaled in brackets 50 and 52. The tire holding means 20 may be moved toward or away from the road wheel 4 to thereby engage or disengage the tire 24 with the road wheel 4. When the tire 24 is moved into engagement with the road wheel 4, it will rotate with the road wheel 4 since it is mounted to rotate freely about spindle 25.

The drive means 30 includes a bracket 32 rigidly affixed to the tire holding means 20 and on which a load cell 56 is mounted, a screw 34 engaging bracket 32, a threaded nut 36 rigidly affixed to the frame 2, and a load motor 42 mounted on a bracket 44 which comprises part of the frame 2. The load motor 42 rotatably drives the screw 34 through reduction gear 38 and gear 54. The screw 34 passes through and is supported by the threaded nut 36. As the screw 34 rotates, it bears against the bracket 32 and thereby drives the tire holding means 20 and consequently the tire 24 into engagement with the road wheel 4 to load the tire 24 or out of engagement with the road wheel 4 to unload the tire 24. The load force on the tire 24 will be transmitted through its spindle 25 to the load cell 56 which will be described in greater detail hereinafter.

Figure 2:
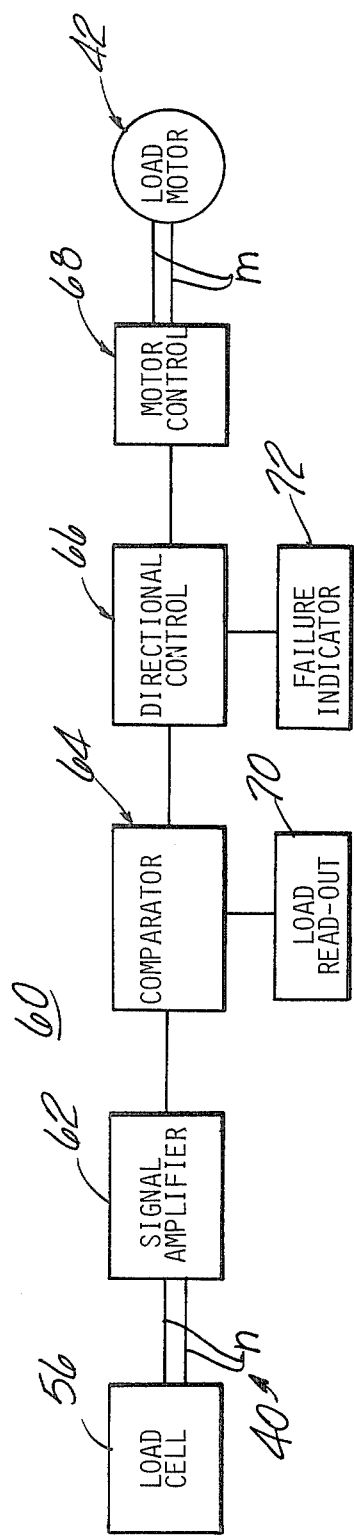
FIG. 2 is a block diagram schematically illustrating the circuitry utilized in the control means and method of the invention.

With reference to FIG. 2, a control means 60 is illustrated in single line schematic diagram form and includes a comparator 64, a directional control 66, and a motor control 68. A load readout 70 and a failure indicator 72, both of which will be discussed in greater detail hereinafter, are respectively connected to the comparator 64 and directional control 66. As will also be discussed in greater detail hereinafter, the sensing means 40 includes the load cell 56 and a signal amplifier 62 connected through lines n to load cell 56. The load cell 56 is of a type well-known in the art which generates a direct voltage signal proportional to the compressive force applied to it. With reference to both FIGS. 1 and 2, the load cell 56 senses the actual load on the tire 24 while the latter is in engagement with the road wheel 4 and generates a signal which is amplified by signal amplifier 62 and applied to the comparator 64. In response to the operation of the control means 60, the load motor 42 which is connected to motor control 68 through lines m, will become operative to drive the screw 34 to thereby increase or decrease the load on tire 24.

Figure 3:
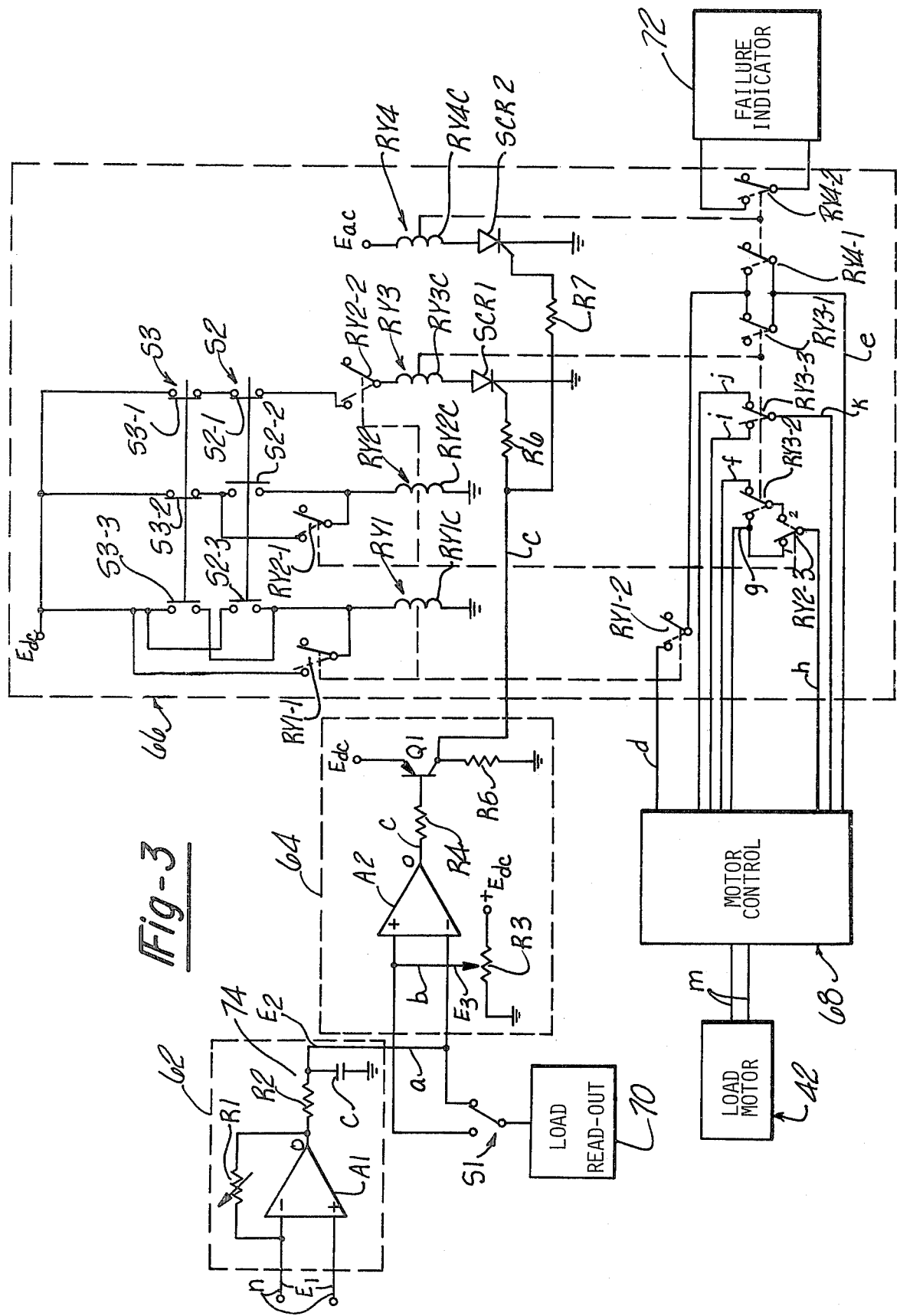
FIG. 3 is a more detailed circuit diagram of the circuitry used in the invention.

Referring now to FIG. 3 of the drawings, the signal amplifier 62 and comparator 64 respectively include amplifier A1 and A2 which are of a type well-known in the art and accordingly will not be described in detail. The amplifier A1 of signal amplifier 62 has an output terminal o and positive (+) and negative (−) input terminals. A variable resistor R1 is connected between the output terminal o and the positive terminal for adjusting the gain of amplifier A1. The positive and negative input terminals of amplifier A1 are connected to the load cell 56 and receive a signal $E_1$ representative of the actual load on the tire 24. A filter 74 is connected to the output terminal o of amplifier A1 and comprises resistor R2 and a capacitor C connected to ground. The output signal $E_2$ on line a from the filter 74 is representative of the actual load on the tire in that it is essentially signal $E_1$, in an amplified form with tire force variation components removed by the filter 74.

The amplifier A2 of comparator 64 has an output terminal o and positive (+) and negative (−) input terminals. The negative (−) input terminal of amplifier A2 is connected via line a to the filter 74 and receives the signal $E_2$ from the filter 74. The positive (+) terminal of amplifier A2 is connected through line b to potentiometer R3 which in turn is connected between ground and a positive (+) direct current voltage $E_{dc}$. The potentiometer functions to provide a tire load reference value and may be preset to produce a desired reference signal $E_3$ on line b to the positive terminal of amplifier A2. The positive and negative terminals of amplifier A2 are also connected through a single pole double throw switch S1 to load read-out 70. Depending on the position of the switch S1, the load read-out 70 will indicate the value of the reference load which has been preset on potentiometer R3 or the level of the actual load on the tire 24.

The output terminal o of amplifier A2 is connected through resistor R4 to the base of transistor Q1. The emitter of transistor Q1 is connected to a positive (+) direct current voltage $E_{dc}$ and the collector of Q1 is connected through a resistor R5 to ground. The amplifier A2 is connected as a comparator such that when the actual load signal $E_2$ is less than the preset load signal $E_3$, the output signal on terminal o of amplifier A2 is positive (+) and the transistor Q1 is in an OFF condition. When the load signal $E_2$ exceeds the preset load signal $E_3$, the amplifier A2 changes its output polarity so that the signal on terminal o of amplifier A2 is negative (−) to thereby bias the transistor Q1 to an ON condition. When transistor Q1 is ON, a signal is conducted through line c and through the isolation resistors R6 and R7 to the gates of silicon controlled rectifiers SCR1 and SCR2 in the directional control 66.

In addition to the silicon controlled rectifiers SCR1 and SCR2, the directional control 66 includes a relay RY1 having a coil RY1C and single pole double throw contacts RY1-1 and RY1-2, a relay RY2 having a coil RY2C and single pole double throw contacts RY2-1, RY2-2 and RY2-3, a relay RY3 having a coil RY3C and single pole double throw contacts RY3-1, RY3-2 and RY3-3, and a relay RY4 having a coil RY4C and single pole double throw contacts RY4-1 and RY4-2. The directional control 66 also includes a load push button switch S2 and an unload push button switch S3. The load push button switch S2 includes a single pole normally closed contact S2-1 and two single pole normally open contacts S2-2 and S2-3. The unload push button switch S3 includes two single pole normally closed contacts S3-1 and S3-2 and one single pole normally open contact S3-3.

As shown in FIG. 3, the coil RY1C or relay RY1 is connected between ground and a positive direct current voltage $E_{dc}$ through contacts S2-3 or S3-3 or RY1-1 when any one of these contacts are in a closed condition. The coil RY2C of relay RY2 is connected between ground and the positive direct current voltage $E_{dc}$ through contact S3-2 when it is in a closed condition and contact S2-2 or contact RY2-1 when either are in a closed condition. The coil RY3C and the anode-cathode circuit of SCR1 are connected between ground and the positive direct current voltage $E_{dc}$ through contacts S3-1, S2-1 and RY2-2 when these contacts are all in a closed condition. The coil RY4C of relay RY4 and the anode-cathode circuit of SCR2 are connected between ground and alternating current voltage $E_{ac}$.

With respect to the connections of the directional control 66 with the motor control 68, contacts RY3-1 and RY4-1 are connected in parallel with each other and individually in series with contact RY1-2. The contacts RY3-1 and RY4-1 are connected via lines d and e to motor control 68 and function to provide a motor start and stop control to the motor control 68. The contacts RY3-2 and RY2-3 are connected in series when the contact RY2-3 is closed through its terminal 2 and the contact RY2-3 bypasses the contact RY3-2 when the contact RY2-3 is closed through its terminal 1. The contacts RY3-2 and RY2-3 are connected to motor control 68 through lines f, g and h and function to provide motor reverse and forward control to the motor control 68. The contact RY3-3 is connected to lines i, j and k leading to motor control 68 and functions to provide motor slow and fast speed control to the motor control 68.

After the tire 24 has been mounted on tire holding means 20 and the necessary power sources (not shown) have been connected to road wheel drive motor 6, motor control 68 and sensing means 40, the load push button switch S2 may be depressed to energize the coils RY1C and RY2C of relays RY1 and RY2. Energizing the coil RY1C will cause the contact RY1-1 to close as shown in phantom line in FIG. 3 to shunt switches S2-3 and S3-3 and maintain coil RY1C energized. Energizing the coil RY1C also switches contact RY1-2 to its position as shown in phantom line in FIG. 3 to provide a start signal to motor control 68 whereby the load motor 42 is energized and the screw 34 is caused to drive the tire holding means 20.

The energization of the coil RY2C causes the contact RY2-1 to move to its position shown in phantom line in FIG. 3 to thereby shunt the contact S2-2 and maintain the coil RY2C energized after the load push button S2 is released. Energizing of the coil RY2C also causes the contacts RY2-2 and RY2-3 to move to their positions as shown in phantom lines in FIG. 3. The contact RY2-3 thereby completes a circuit through lines h and f and contact RY3-2 so that contact RY3-2 has sole control over the direction of operation of motor 42. Upon depressing of push button switch S2 and when movement of the tire 24 begins, the contact RY3-2 is in its full line position as shown in FIG. 3 and in this position the operation of the motor 42 is forward and the tire 24 moves toward the road wheel 4. When the tire 24 engages the road wheel 4 and is loaded to a level resulting in an indication from the load cell 56 in the form of signal $E_1$ such that the level of signal $E_2$ exceeds the level of the preset load value signal $E_3$, the amplifier A2 will change polarity at its output terminal o and cause the transistor Q1 to be turned ON and provide an output signal on line c. The signal on line c is applied through resistors R6 and R7 to the gates of SCR1 and SCR2 to switch them to an ON condition. The SCR1 will thus complete a circuit through its anode and cathode terminals and through coil RY3C and the contact RY2-2 in its closed position as shown in phantom line in FIG. 3. Since the power source for SCR1 is a direct current potential, the SCR1 will remain in an ON condition until its anode to cathode circuit is interrupted by the opening of one of the contacts in series with such circuit. The energizing of the coil RY3C causes the movement of the contacts RY3-1, RY3-2 and RY3-3 to their phantom line positions as shown in FIG. 3. The movement of the contact RY3-3 to its phantom line position will cause the motor control 68 to control the motor 42 to run at its slow speed. The movement of the contact RY3-2 to its phantom line position will complete a circuit through the contact RY2-3 and lines h and g to the motor control 68 to cause it to reverse the direction of the motor 42 and thereby the screw 34 so that the tire 24 is moved away from the road wheel 4 to thereby decrease the load on the tire 24. The movement of the contact RY3-1 to its phantom line position results in contact RY4-1 being the only contact which will control the starting and stopping of the motor 42 via motor control 68 while the tire 24 is in a loaded condition in engagement with the road wheel 4.

Since the SCR2 is energized through its anode to cathode circuit by the potential $E_{ac}$, it will be in an ON condition only while a biasing signal from transistor Q1 is being applied to its gate terminal. Thus, when SCR2 turns ON, coil RY4C is energized to thereby switch contact RY4-1 to its phantom line position as shown in FIG. 3 and cause the motor 42 to operate. Since contact RY3-2 is in its phantom line position, the motor 42 will operate in a reverse direction to decrease the load on tire 24. When the load decreases to a point such that transistor Q1 is turned OFF, the signal to the gate of SCR2 will cease and therefore SCR2 will turn OFF. In turn, relay coil RY4C will be deenergized and contact RY4-1 will move to its full line position to stop the motor 42. Since SCR1 remains ON subsequent to the actual load on the tire 24 exceeding the preset load value, the coil RY3C will remain energized and contact RY3-1 will remain in its phantom line position. Thus, contact RY4-1 will have sole control over the starting and stopping of motor 42. Moreover, since contacts RY3-2 and RY2-3 remain in their respective phantom line positions subsequent to the actual tire load exceeding the preset load value, the motor 42 will operate only in its reverse or load decreasing direction.

Figure 4:
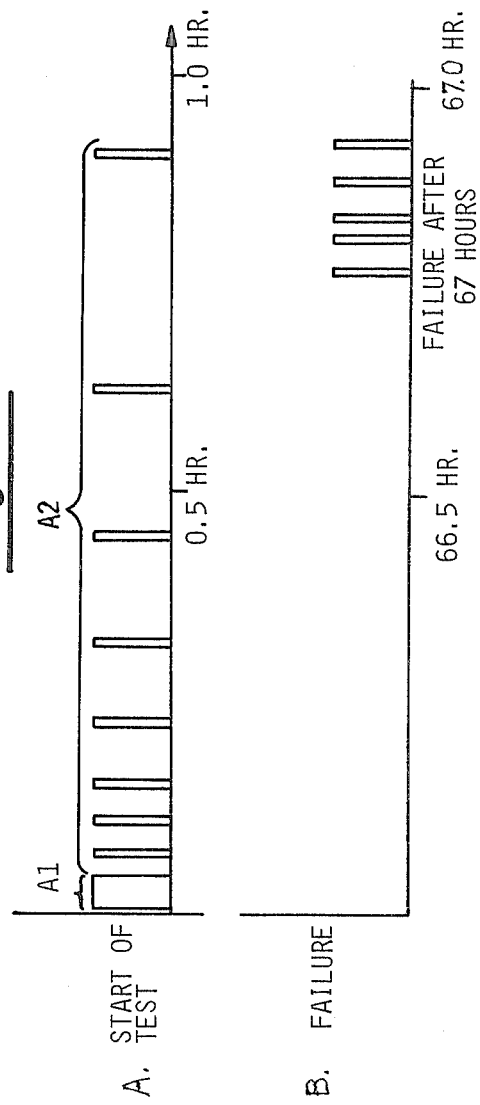
FIG. 4 shows two graphs illustrating the operation of the control means according to the invention.

In view of the fact that SCR2 conducts and the coil RY4C of relay RY4 is energized and its contact RY4-1 moves to operate motor 42 only when the actual load on tire 24 exceeds the preset load level subsequent to the initial exceeding of the preset load level by actual load, the operation of these elements of the control can be utilized to provide a clear indication of incipient failure of the tire 24. As previously discussed, at the inception of failure of a tire, its temperature will rise and its inflation air pressure will therefore increase to consequently increase the load on the tire. Thus, in the event that the tire 24 begins to fail while undergoing testing, the SCR2 will be turned ON to energize the coil RY4C of relay RY4 and switch the contact RY4-2 to its phantom line position as shown in FIG. 3. The contact RY4-2, of course, will be switched each time there is a load increase causing the coil RY4C to be energized. However, during normal load increases, e.g., during the warm-up period of the tire, the frequency of load increase and therefore the frequency of switching of contact RY4-2 will be at a relatively slow rate. On the other hand, during incipient failure of a tire, the temperature rise and consequent load increase will be relatively rapid so that operation of contact RY4-2 will correspondingly increase. In FIG. 4 there are shown graphs A and B which respectively illustrate the operation of a load motor at the start of a tire test and at the failure of the tire undergoing testing. With reference to section A1 of graph A, the load motor is operating in a forward direction to load the tire. In section A2 the load motor operates only to decrease load on the tire as equilibrium test conditions are approached. Graph B illustrates load motor operation five times during a period of about 20 minutes as the tire fails. The contact RY4-2 is connected through lines m and n to a failure indicator 72 which monitors the frequency of signals generated as the result of the switching of contact RY4-2 and provides a suitable indication when its frequency exceeds a preset value. The failure indicator 72 may be any suitable device known in the art for measuring and comparing the frequency of an event with a desired rate and providing an indication when the frequency exceeds the desired rate.

It is thus seen that a load control means for tire testing apparatus has been provided in which the control means is inactive and a motor and loading means for applying load to the tire are in an off condition subsequent to initial loading of the tire except when it is necessary to decrease the load on the tire. Such a means provides the very significant advantage that the control system and the loading means are at rest during most of the testing period to thereby substantially increase their operating lives. This also results in a more economical control system having a relatively low initial cost and which provides a significant energy saving. Moreover, due to the fact that the control system is inactive except for load decreases subsequent to the initial loading of the tire to a preset load value, the operation of the control system to decrease the load can be readily monitored and used to provide an indication of incipient failure.

While there has been described above a preferred embodiment of the method and apparatus of the invention, the invention is not restricted to the specific structural details and circuit connections herein set forth, inasmuch as modifications thereof may be effected without departing from the spirit and scope of the invention.

What is claimed is:

1. In an apparatus for testing tires including a rotatable road wheel, means for rotating the road wheel, and tire holding means rotatably mounting a tire and being movable to engage and disengage the tire with the road wheel whereby the tire rotates with the road wheel when so engaged, the combination comprising:

drive means for applying force to the tire holding means to move it and apply and remove load on the tire when the latter is engaged with the road wheel; and control means including:
means for sensing the actual load on the tire while the tire is in engagement with the road wheel;
comparator means connected to said sensing means for comparing the actual load on the tire with a reference load value and providing an indication when the actual load and the reference load value differ; and
directional means connected between the comparator means and the drive means, said directional means having a condition in which it is responsive to an indication from the comparator means only to operate the drive means in a direction to decrease the load on a tire.

2. The combination according to claim 1 wherein the comparator means provides said indication only when the actual load exceeds the reference load value.

3. The combination according to claim 1 wherein the directional means is responsive to said indication to operate the drive means in a direction to decrease the load on a tire subsequent to application of load to the tire by the drive means in excess of the reference load value.

4. The combination according to claim 1 wherein said directional means assumes said condition in response to application of load to the tire by the drive means in excess of the reference load value.

5. The combination according to claim 1 wherein, when said directional means is in said condition, the drive means is in an inactive condition except when operating to decrease the load on said tire.

6. The combination according to claim 5 wherein said drive means includes a drive motor, said drive motor being deenergized when the drive means is in said inactive condition.

7. In a method for testing tires wherein a tire is movable into and out of engagement with a rotating road wheel and rotates with the road wheel when so engaged, the steps comprising:
applying a load to said tire while the tire is in engagement with the road wheel;
sensing the load applied to the tire and comparing the applied load with a desired load value;
producing an indication only when the applied load exceeds the desired load value; and
reducing the applied load in response to said indication.

8. The method according to claim 7 further comprising the steps of:
sensing the frequency of occurrence of the production of said indication; and
when said indication is produced at a frequency in excess of a desired value, removing the tire from engagement with the road wheel.

9. In a method for testing tires utilizing a rotating road wheel, movable tire holding means rotatably mounting a tire in loaded engagement with the road wheel, tire loading means, and control means for operating the loading means to thereby control the load on the tire, the steps comprising;
operating the control means to apply a load to said tire;
sensing the load applied to the tire and comparing the applied load with a desired load value;
producing an indication when the applied load differs from the desired load value; and
operating the control means only to reduce the applied load in response to said indication.

10. The method according to claim 9 wherein the loading means is maintained inactive except when applied load is being reduced.

11. In a method for testing tires utilizing a rotating road wheel, movable tire holding means rotatably mounting a tire in loaded engagement with the road wheel, tire loading means, and control means for operating the loading means to thereby control the load on the tire, the steps comprising: operating the control means to apply a load to said tire; sensing the load applied to the tire and comparing the applied load with a desired load value;
producing an indication when the applied load differs from the desired load value; and
operating the control means only to reduce the applied load in response to said indication only subsequent to the exceeding of the desired load value by the applied load.

12. The method according to claim 11 wherein the control means is operable to reduce the applied load only subsequent to the exceeding of the desired load value by the applied load.

* * * * *